(12) United States Patent
Xu et al.

(10) Patent No.: US 10,345,648 B2
(45) Date of Patent: Jul. 9, 2019

(54) BACKLIGHT STRUCTURE AND LIQUID CRYSTAL DISPLAY DEVICE

(71) Applicants: Boe Technology Group Co., Ltd., Beijing (CN); Hefei Boe Optoelectronics Technology Co., Ltd., Hefei, Anhui (CN)

(72) Inventors: Jun Xu, Beijing (CN); Qing Zhang, Beijing (CN); Hu Li, Beijing (CN); Tongmin Liu, Beijing (CN); Linfei Shao, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/805,021

(22) Filed: Nov. 6, 2017

(65) Prior Publication Data

US 2018/0267364 A1    Sep. 20, 2018

(30) Foreign Application Priority Data

Mar. 14, 2017   (CN) .......................... 2017 1 0149270

(51) Int. Cl.
  *G02F 1/1335*   (2006.01)
  *G02F 1/1368*   (2006.01)

(52) U.S. Cl.
  CPC ...... *G02F 1/133615* (2013.01); *G02F 1/1368* (2013.01); *G02F 1/133536* (2013.01)

(58) Field of Classification Search
  CPC .................. G02F 1/1368; G02F 1/1335; G02F 1/133524; G02F 1/133528;
  (Continued)

(56) References Cited

U.S. PATENT DOCUMENTS 5,808,713 A * 9/1998 Broer ................ G02F 1/133615
                                                           349/115
5,816,677 A    10/1998 Kurematsu et al.
(Continued)

FOREIGN PATENT DOCUMENTS

CN    1144913         3/1997
CN    1165564 A       11/1997
(Continued)

OTHER PUBLICATIONS

Office Action received for Chinese Patent Application No. 201710149270.2, dated Apr. 1, 2019, 14 pages (6 pages of English Translation and 8 pages of Office Action).

*Primary Examiner* — Thoi V Duong
(74) *Attorney, Agent, or Firm* — Womble Bond Dickinson (US) LLP

(57) ABSTRACT

The present disclosure provides a backlight structure and a liquid crystal display device. The backlight structure comprises: an array substrate; a polarizer layer on a back face of the array substrate; and a light source at a light incident side of the array substrate. Specifically, the light source is configured such that light emitted thereby is emitted into the array substrate from the light incident side of the array substrate and incident on the polarizer layer. Moreover, the polarizer layer is configured for reflecting the light incident thereon while polarizing the reflected light and emitting it out from a front face of the array substrate, wherein the front face and the back face of the array substrate face each other and intersect the light incident side of the array substrate respectively.

16 Claims, 1 Drawing Sheet

(58) Field of Classification Search
CPC ............. G02F 1/133305; G02F 1/1336; G02F 1/133615; G02F 1/13362; G02F 1/1333; G02F 1/133536; G02F 1/133553; G02F 1/1362; G02F 1/133602; G02F 1/133555; G02F 2001/133302; G02F 2001/133548; G02F 2001/133562; G02F 2001/133567; G02F 2001/133507; G02F 2201/56; G02F 2203/09; H01L 27/3262; H01L 27/3244; H01L 33/60; H01L 33/405; G02B 6/0068; G02B 6/0088; G02B 6/0055; G02B 6/009; G02B 6/00; G02B 6/0031; G02B 6/0073; G02B 6/0091; G02B 5/30; G02B 27/26

See application file for complete search history.

(56) References Cited

U.S. PATENT DOCUMENTS

| | | |
|---|---|---|
| 2008/0297696 A1 | 12/2008 | Banerjee |
| 2010/0060819 A1 | 3/2010 | Creusen et al. |
| 2017/0075169 A1* | 3/2017 | Hayama ............. G02F 1/133615 |

FOREIGN PATENT DOCUMENTS

| | | |
|---|---|---|
| CN | 101021648 A | 8/2007 |
| CN | 101216631 A | 7/2008 |
| CN | 101673006 A | 3/2010 |
| CN | 106896566 A | 6/2017 |
| TW | 200916862 A | 4/2009 |

* cited by examiner

BACKLIGHT STRUCTURE AND LIQUID CRYSTAL DISPLAY DEVICE

CROSS REFERENCE TO RELATED APPLICATIONS

The present application claims the priority of the Chinese patent application No. 201710149270.2 filed on Mar. 14, 2017, the disclosure of which is incorporated herein by reference.

FIELD

The present disclosure relates to liquid crystal display technologies, and in particular to a backlight structure and a liquid crystal display device.

BACKGROUND ART

At present, in the field of displays, liquid crystal display device is still one of the most popular display devices in great demand. Meanwhile, there has also been a demand for a lighter and thinner display from customers. However, restricted by the state of the art and conventional display structures (in which a light guide plate faces a lower polarizer layer, with the lower polarizer layer arranged on a glass substrate, an array substrate arranged on the glass substrate, a liquid crystal layer arranged on the array substrate, a display panel layer arranged on the liquid crystal layer, and an upper polarizer layer arranged on the display panel layer), it would be difficult for thinning liquid crystal display devices.

SUMMARY

The present disclosure provides a backlight structure in order to solve at least one of the above technical problems. Such a backlight structure is simple, light and thin. Also, when it is applied to a liquid crystal display device, a lighter and thinner liquid crystal display device can be obtained easily. Thus, the user's need for purchasing such a liquid crystal display device can be better satisfied.

To achieve the above goal, the present disclosure provides a backlight structure. The backlight structure comprises: an array substrate; a polarizer layer on a back face of the array substrate; and a light source at a light incident side of the array substrate. Specifically, the light source is configured such that light emitted thereby is emitted into the array substrate from the light incident side of the array substrate and incident on the polarizer layer. Moreover, the polarizer layer is configured for reflecting the light incident thereon while polarizing the reflected light and emitting it out from a front face of the array substrate. It should be pointed out that, in the above backlight structure, the front face and the back face of the array substrate face each other and intersect the light incident side of the array substrate respectively.

Optionally, in the backlight structure according to an embodiment of the present disclosure, the light incident side of the array substrate obliquely intersects the front face of the array substrate at an obtuse angle.

Optionally, in the backlight structure according to an embodiment of the present disclosure, the light incident side of the array substrate and the front face of the array substrate enclose an angle of about 120 degrees. Besides, the light source comprises an area light source parallel to the light incident side of the array substrate, and has a light emitting angle of about 120 degrees. Furthermore, the array substrate has a refractive index of about 1.5.

Optionally, in the backlight structure according to an embodiment of the present disclosure, the light incident side of the array substrate and the back face of the array substrate enclose an angle of about 60 degrees.

Optionally, in the backlight structure according to an embodiment of the present disclosure, the polarizer layer is deposited on the back face of the array substrate by photo-lithography.

Optionally, in the backlight structure according to an embodiment of the present disclosure, the polarizer layer comprises a wire grid polarizer or a dual brightness enhancement film reflective polarizer.

Optionally, in the backlight structure according to an embodiment of the present disclosure, the array substrate comprises a thin film transistor substrate provided with an array layer on a front face thereof, and the light source comprises a light emitting diode (LED).

Optionally, in the backlight structure according to an embodiment of the present disclosure, the thin film transistor substrate is made of glass or flexible material.

The present disclosure further provides a liquid crystal display device. The liquid crystal display device comprises the backlight structure described in any of the above embodiments, and a display structure, wherein the display structure is located on the front face of the array substrate.

Optionally, in the liquid crystal display device according to an embodiment of the present disclosure, the display structure comprises: a liquid crystal layer on the front face of the array substrate; a display panel layer on the liquid crystal layer; and an upper polarizer layer on the display panel layer.

BRIEF DESCRIPTION OF THE DRAWINGS

Other features and advantages of the present disclosure will be illustrated in the following detailed description, which will partly become obvious from the detailed description, or be understood through implementations of the present disclosure. Goals and other advantages of the present disclosure can be realized and achieved from structures specially indicated in the detailed description, claims and drawings.

The drawings are used to provide further understanding of technical solutions of the present disclosure and constitute part of the detailed description. Besides, the drawings are used to explain technical solutions of the present disclosure together with embodiments of the present application, and should not be construed as limiting to technical solutions of the present disclosure.

DETAILED DESCRIPTION OF THE EMBODIMENTS

To render the goals, technical solutions and advantages of the present disclosure clearer, embodiments of the present disclosure will be described below in detail with reference to the drawings. It should be noted that embodiments in the present application and features in these embodiments can be combined with each other randomly under circumstances that there is no conflict.

Many specific details are illustrated below to facilitate a thorough understanding of the present disclosure. However, the present disclosure can also be implemented in manners other than those described herein. Therefore, the protection scope of the present disclosure is not limited to the specific embodiments as disclosed below.

Figure 1:
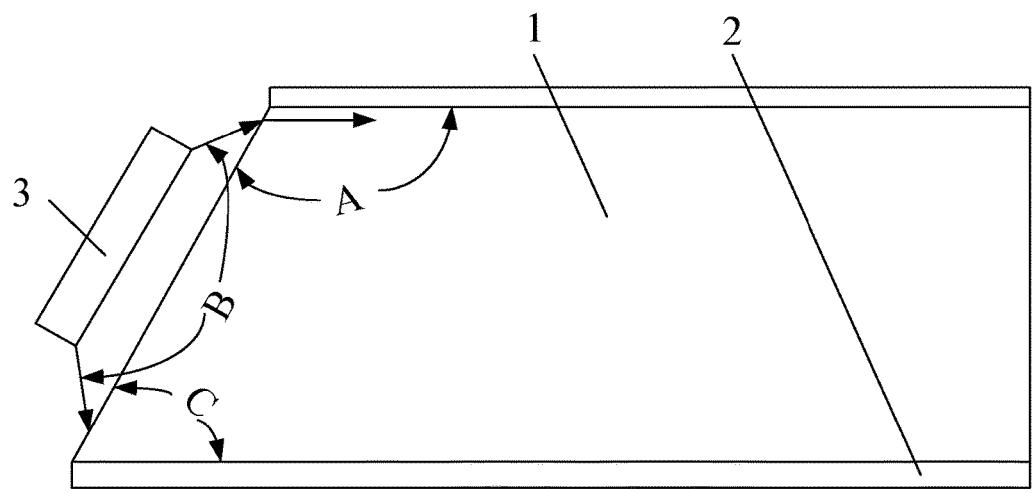
FIG. 1 is a schematic structure view for a backlight structure according to an embodiment of the present disclosure.
Figure 2:
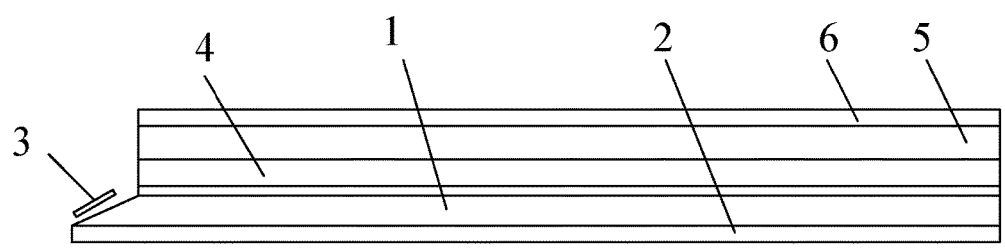
FIG. 2 is a schematic structure view for a liquid crystal display device according to an embodiment of the present disclosure.
Figure 3:
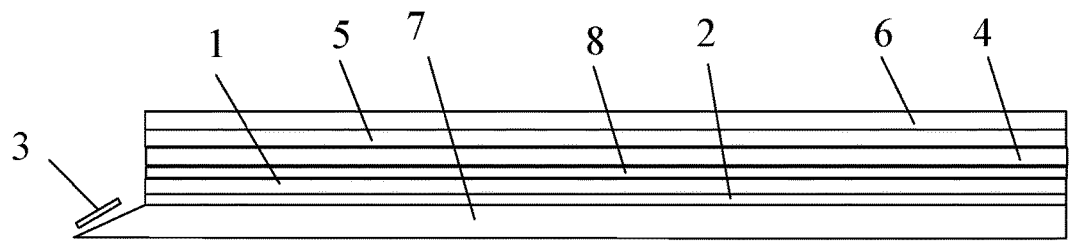
FIG. 3 is a schematic structure view for a liquid crystal display device according to another embodiment of the present disclosure.

It should be noted that, in FIG. 1 to FIG. 3, various components are indicated by the following reference signs respectively: 1 array substrate, 2 polarizer layer, 3 light source, 4 liquid crystal layer, 5 display panel layer, 6 upper polarizer layer, 7 thin film transistor substrate, and 8 array layer.

The backlight structure and the liquid crystal display device according to an embodiment of the present disclosure will be described below with reference to the drawings.

The present disclosure provides a backlight structure. As shown in FIG. 1, the backlight structure comprises: an array substrate 1; a polarizer layer 2 arranged on a back face of the array substrate 1; and a light source 3 arranged at a light incident side, in particular a left side, of the array substrate 1. Specifically, the light source 3 is configured such that light emitted thereby is emitted into the array substrate 1 from the light incident side of the array substrate 1 and incident on the polarizer layer 2. Moreover, the polarizer layer 2 is configured for reflecting the light incident thereon while polarizing the reflected light and emitting it out from a front face of the array substrate 1. As can be seen from FIG. 1, in the backlight structure, the front face (i.e., an upper face) and the back face (i.e., a lower face) of the array substrate 1 face each other and intersect the light incident side (i.e., a left side) of the array substrate 1 respectively.

In the backlight structure provided by the present disclosure, light emitted by the light source 3 is emitted into the array substrate 1 from the left side of the array substrate 1 and emitted out from the front face of the array substrate 1 after being reflected by the polarizer layer 2 on the back face of the array substrate 1. In this manner, the existing sealant backlight structure is replaced. The backlight structure according to embodiments of the present disclosure is simpler, lighter and thinner. Also, when it is applied in a liquid crystal display device, there is no need to arrange a glass substrate separately. Therefore, in the liquid display device finally fabricated, a thickness of one glass substrate is saved, which finally makes the liquid crystal display device thinner in thickness and lighter in weight.

Optionally, in the backlight structure provided by an embodiment of the present disclosure, the light source 3 can be arranged either on a left side of the array substrate 1, or on a right side of the array substrate 1. The special arrangement as listed here and other alternative arrangements comprehensible for one skilled in the art can all achieve the goals of the present application, and shall fall within the protection scope of the present application, without deviating from the idea of the present application.

Optionally, in the backlight structure provided by an embodiment of the present disclosure, the light incident side of the array substrate 1 obliquely intersects the front face of the array substrate 1, particularly at an obtuse angle. In particular, the light source 3 is arranged parallel to the light incident side of the array substrate 1, and light emitted from the light source 3 towards the light incident side of the array substrate 1 is at most parallel to the front face of the array substrate 1. This ensures that light emitted from the light source 3 can be incident onto the polarizer layer 2 on the back face of the array substrate 1, and prevents light from being directly emitted out from the front face of the array substrate 1 thus affecting normal displays of the display.

Optionally, part of the light incident on the polarizer layer 2 is reflected and the other part is transmitted. Specifically, the transmitted light is emitted out from the back face of the array substrate 1, and the part emitted out in this way can be reflected back into the array substrate 1 by a plurality of other additional evaporation layers.

Specifically, as shown in FIG. 1, in the backlight structure provided by an embodiment of the present disclosure, an angle A enclosed between the light incident side of the array substrate 1 and the front face of the array substrate 1 is about 120 degrees. Besides, the light source 3 comprises an area light source parallel to the light incident side of the array substrate and has a light emitting angle B of about 120 degrees. In particular, a refractive index of the array substrate 1 is further chosen as about 1.5. In this case, light emitted into the array substrate 1 will not be directly incident on the front face of the array substrate and emitted out therefrom. Also, light is propagated at most in parallel to the front face of the array substrate 1, and thereby the display effect is ensured.

Optionally, in the backlight structure provided by an embodiment of the present disclosure, an angle C enclosed between the light incident side of the array substrate 1 and the back face of the array substrate 1 is about 60 degrees. The array substrate 1 fabricated in this way has a front face and a back face parallel to each other. This helps to facilitate the general layout, manufacture and storage of the array substrate 1, as well as the appearance and thinness thereof.

Obviously, according to other embodiments, the angle enclosed between the light incident side of the array substrate 1 and the back face of the array substrate can also be about 10 degrees, 20 degrees, 30 degrees, 70 degrees, 80 degrees, 120 degrees, and so on. Such alternative manners can all achieve the goals of the present application without deviating from the idea of the present disclosure. Such alternative forms will not be detailed herein for simplicity, and they shall all fall within the protection scope of the present application.

It should be pointed out that, in FIG. 1, the arrows indicate light rays, especially, propagation directions of light rays.

Optionally, in the backlight structure according to an embodiment of the present disclosure, the polarizer layer 2 is deposited on the array substrate 1, in particular on the back face 1 of the array substrate, by photolithography. Such a formation process is simpler and more efficient, which further facilitates industrial production.

Obviously, one skilled in the art should easily understand that the polarizer layer 2 can also be directly jet-printed on the array substrate 1. Such equivalent implementations can all achieve the goals of the present application without deviating from the idea of the present disclosure. Such equivalent implementations will not be detailed herein for simplicity, and they should all fall within the protection scope of the present application.

Specifically, in an optional example, the polarizer layer 2 comprises a wire grid polarizer (WGP) or a dual brightness enhancement film (DBEF) reflective polarizer.

Specifically, in another optional example, the array substrate 1 comprises a thin film transistor substrate provided with an array layer on a front face thereof, and the light source 3 comprises an LED light source.

In particular, in the backlight structure according to an embodiment of the present disclosure, the thin film transistor substrate can be a transparent plate made of glass, resin or flexible material. Obviously, from the teaching of the present disclosure, one skilled in the art can easily conceive of other materials for obtaining a thin film transistor substrate, and such materials can all achieve the goals of the present application without deviating from the idea of the present disclosure. Such alternative materials will not be detailed herein for simplicity, and they shall all fall within the protection scope of the present application.

According to another aspect, the present disclosure further provides a liquid crystal display device. The liquid crystal display device comprises the backlight structure described in any of the above embodiments, and a display structure, wherein the display structure is arranged on the front face of the array substrate 1.

The liquid crystal display device provided according to the embodiments of the present disclosure has all advantages of the backlight structure apart from a thinner thickness and a lighter weight. Besides, such a liquid crystal display device can further facilitate augmented reality (AR) display or transparent display.

Optionally, in the liquid crystal display device provided according to an embodiment of the present disclosure, the display structure comprises: a liquid crystal layer 4 arranged on the front face of the array substrate 1; a display panel layer 5 arranged on the liquid crystal layer 4; and an upper polarizer layer 6 arranged on the display panel layer 5.

As can be seen from the above embodiments, in the liquid crystal display device, structures such as a glass substrate are saved. As a result, the fabricated liquid crystal display device is lighter and thinner.

To sum up, in the backlight structure provided by the present disclosure, light emitted by the light source is emitted into the array substrate from the light incident side of the array substrate and emitted out from the front face of the array substrate after being reflected by the polarizer layer on the back face of the array substrate. In this way, the existing sealant backlight structure is replaced. The backlight structure according to the embodiments of the present disclosure is simpler, lighter and thinner. Also, when it is applied in a liquid crystal display device, there is no need to arrange a glass substrate separately. Therefore, in the liquid display device that is finally fabricated, a thickness of one glass substrate is saved, which makes the liquid crystal display device thinner in the final thickness and lighter in weight.

According to another embodiment of the present disclosure, a backlight structure is further provided. With reference to FIG. 3, the backlight structure comprises: a thin film transistor substrate 7; a polarizer layer 2 arranged on a front face of the thin film transistor substrate 7; and a light source 3 arranged at a light incident side of the thin film transistor substrate 7. In particular, the light source 3 can be further arranged on a back face of the thin film transistor substrate 7. Specifically, the light source 3 is configured such that light emitted thereby is emitted into the thin film transistor substrate 7 from the light incident side of the thin film transistor substrate 7 and incident on the polarizer layer 2. Moreover, the polarizer layer 2 is configured for transmitting the light incident thereon while polarizing the transmitted light and emitting it out from the front face of the thin film transistor substrate 7. This also helps to achieve the goals of the present application without deviating from the idea of the present disclosure.

According to yet another aspect of the present disclosure, a liquid crystal display device is further provided. As shown in FIG. 3, the liquid crystal display device comprises the backlight structure described in any of the above embodiments, and a display structure, wherein the display structure is arranged on the front face of the thin film transistor substrate 7.

Specifically, as shown in FIG. 3, the display structure comprises: an array substrate 1 with a back face thereof facing a polarizer layer 2, the polarizer layer 2 being arranged on the front face of the thin film transistor substrate 7; a liquid crystal layer 4 arranged on the front face of the array substrate 1; a display panel layer 5 arranged on the liquid crystal layer 4; and an upper polarizer layer 6 arranged on the display panel layer 5.

Optionally, the array substrate 1 is a glass substrate provided with an array layer 8 on the front face thereof, and the polarizer layer 2 comprises a wire grid polarizer (WGP) or a dual brightness enhancement film (DBEF) reflective polarizer.

It should be pointed out that in the depictions herein, terms such as "install", "link", "connect", and "fix" should all be understood in a broader sense. For example, "connect" can refer to a fixed connection, a detachable connection, or an integrated connection. Likewise, "connect" can also refer to a direct connection, or an indirect connection via intermediate media. For a person having ordinary skills in the art, specific meanings of the above terms herein can be understood upon specific situations.

It should be further pointed out that in the depictions of the present description, terms such as "an embodiment", "some embodiments", and "a specific embodiment" are intended to mean that specific features, structures, materials or characteristics described with reference to an embodiment or example are comprised in at least one of the embodiments or examples herein. In this description, schematic expressions of the above terms do not necessarily refer to a same embodiment or example. Besides, the specific features, structures, materials or characteristics described in this manner can be combined in a suitable manner in any one or more embodiments or examples.

Although specific implementations of the present disclosure have been described above, the described contents are only implementations used for facilitating understanding of the present disclosure, rather than limitations to the present disclosure. Any skilled person in the art of the present disclosure can make any modifications and variations in terms of forms and details of the implementations without deviating from the spirit and scope disclosed in the present disclosure. However, the protection scope of the present disclosure is still subject to the scope of the appended claims.

The invention claimed is:
1. A backlight structure, comprising:
an array substrate;
a polarizer layer on a back face of the array substrate; and
a light source at a light incident side of the array substrate, wherein
the light source is configured such that light emitted thereby is emitted into the array substrate from the light incident side of the array substrate and incident on the polarizer layer, and
the polarizer layer is configured for reflecting the light incident thereon while polarizing the reflected light and emitting it out from a front face of the array substrate, wherein the front face and the back face of the array substrate face each other and intersect the light incident side of the array substrate respectively, wherein the light incident side of the array substrate obliquely intersects the front face of the array substrate at an obtuse angle.

2. The backlight structure according to claim 1, wherein
the light incident side of the array substrate and the front face of the array substrate enclose an angle of about 120 degrees,
the light source comprises an area light source parallel to the light incident side of the array substrate and has a light emitting angle of about 120 degrees, and
the array substrate has a refractive index of about 1.5.

3. The backlight structure according to claim 2, wherein
the light incident side of the array substrate and the back face of the array substrate enclose an angle of about 60 degrees.

4. The backlight structure according to claim 3, wherein
the array substrate comprises a thin film transistor substrate provided with an array layer on a front face thereof, and
the light source comprises a light emitting diode (LED).

5. The backlight structure according to claim 2, wherein
the array substrate comprises a thin film transistor substrate provided with an array layer on a front face thereof, and
the light source comprises a light emitting diode (LED).

6. The backlight structure according to claim 1, wherein
the polarizer layer is deposited on the back face of the array substrate by photolithography.

7. The backlight structure according to claim 6, wherein
the array substrate comprises a thin film transistor substrate provided with an array layer on a front face thereof, and
the light source comprises a light emitting diode (LED).

8. The backlight structure according to claim 1, wherein
the polarizer layer comprises a wire grid polarizer or a dual brightness enhancement film reflective polarizer.

9. The backlight structure according to claim 8, wherein
the array substrate comprises a thin film transistor substrate provided with an array layer on a front face thereof, and
the light source comprises a light emitting diode (LED).

10. The backlight structure according to claim 1, wherein
the array substrate comprises a thin film transistor substrate provided with an array layer on a front face thereof, and
the light source comprises a light emitting diode (LED).

11. The backlight structure according to claim 10, wherein
the thin film transistor substrate is made of glass or flexible material.

12. A liquid crystal display device, comprising:
the backlight structure according to claim 1; and
a display structure, wherein
the display structure is located on the front face of the array substrate.

13. The liquid crystal display device according to claim 12, wherein
the display structure comprises:
a liquid crystal layer on the front face of the array substrate;
a display panel layer on the liquid crystal layer; and
an upper polarizer layer on the display panel layer.

14. The liquid crystal display device according to claim 12, wherein
the polarizer layer is deposited on the back face of the array substrate by photolithography.

15. The liquid crystal display device according to claim 12, wherein
the polarizer layer comprises a wire grid polarizer or a dual brightness enhancement film reflective polarizer.

16. The liquid crystal display device according to claim 12, wherein
the array substrate comprises a thin film transistor substrate provided with an array layer on a front face thereof, and
the light source comprises a light emitting diode (LED).

* * * * *